(12) United States Patent
Caddell

(10) Patent No.: US 9,911,515 B2
(45) Date of Patent: Mar. 6, 2018

(54) LEIDENPUMP

(71) Applicant: John Chapman Caddell, Carmel, CA (US)

(72) Inventor: John Chapman Caddell, Carmel, CA (US)

( * ) Notice: Subject to any disclaimer, the term of this patent is extended or adjusted under 35 U.S.C. 154(b) by 403 days.

(21) Appl. No.: 14/626,033

(22) Filed: Feb. 19, 2015

(65) Prior Publication Data

US 2015/0235719 A1    Aug. 20, 2015

Related U.S. Application Data

(60) Provisional application No. 61/941,844, filed on Feb. 19, 2014.

(51) Int. Cl.
| | | |
|---|---|---|
| G21C 15/257 | (2006.01) |
| F15D 1/00 | (2006.01) |
| F04B 19/20 | (2006.01) |
| F04B 19/24 | (2006.01) |
| F15D 1/06 | (2006.01) |
| F16L 9/00 | (2006.01) |
| F16L 59/147 | (2006.01) |

(52) U.S. Cl.
CPC ............ *G21C 15/257* (2013.01); *F04B 19/20* (2013.01); *F04B 19/24* (2013.01); *F15D 1/0065* (2013.01); *F15D 1/06* (2013.01); *F16L 9/006* (2013.01); *F16L 59/147* (2013.01); *Y02E 30/40* (2013.01)

(58) Field of Classification Search
CPC ...... F15D 1/002; F15D 1/0065; G21C 15/257
See application file for complete search history.

(56) References Cited

U.S. PATENT DOCUMENTS 8,025,271 B2 * 9/2011 Kolodner ................ F15D 1/065
261/76

OTHER PUBLICATIONS

Yang, Mingcheng and Marisol Ripoll, "Thermoosmotic microfluidics," Soft Matter, 2016, 12, 8564-8573 (Sep. 12, 2016).*
Paul, Gayatri, et al., "Droplet oscillation and pattern formation during Leidenfrost phenomenon," Experimental Thermal and Fluid Science 60 (2015) 346-354 (first available online Jun. 2, 2014).*
Jobson, Christopher, "Water Droplets Flow Uphill through a Superheated Maze Thanks to the Leidenfrost Effect," www.thisiscolossal.com/2014/03/water-maze/ (Mar. 16, 2014).*
Linke et al., "Self-Propelled Leidenfrost Droplets," Physical Review Letters, PRL 96, 154502 (2006) 154502-1-4 (Apr. 21, 2006).*

* cited by examiner

*Primary Examiner* — Patrick Hamo
(74) *Attorney, Agent, or Firm* — Cantor Colburn LLP

(57) ABSTRACT

A non-mechanical fluid transfer device is disclosed herein. The device can include at least one tubular body configured to deliver a fluid, the tubular body having an interior surface, an exterior surface, a proximal end, and a distal end. Additionally, the device can include a series of ratchets disposed along an interior surface of the tubular body such that the fluid moves from the proximal end of the tubular body to the distal end of the tubular body when the interior surface of the tubular body is heated to a temperature at or above the Leidenfrost point of the fluid. Additional aspects are described herein.

6 Claims, 6 Drawing Sheets

Concentric Ratcheted Grooves

Chevron Ratchets 612

Continuous Spiral Ratchet

LEIDENPUMP

FIELD

The present disclosure generally relates to fluid transfer devices and systems, and more particularly, to non-mechanical fluid transfer devices and systems.

BACKGROUND

Fluid transport and delivery systems—typically formed of mechanical pumps, such as electric and pneumatic pumps—tend to require electricity to function (either input directly into an electric motor or in the form of an air compressor system to drive pneumatic pumps). Specifically, pumps and pump systems require electricity to control and operate the pump systems. As such, typical fluid transfer systems pose serious threats, particularly in applications that require cooling for safety as in nuclear reactor cores. In such applications, systems require complex back-up generator systems that can dramatically increase the expense and complexity of operating a system. Moreover, as was the case in at least one recent nuclear meltdown, these back-up generators are susceptible to failure, which can lead to catastrophic cooling system failures and ultimately, meltdown.

Additionally, with expanding populations in arid regions, clean drinking water is becoming increasingly expensive and harder for localities to meet demand. Typically, arid and remote regions have relied on complex ground-water, reservoir, and desalination systems to meet water demand. These systems generally come at great cost.

Accordingly, there remains a need for improved non-mechanical fluid delivery devices and systems that can be employed in passive systems that are designed to efficiently move fluid without additional operating cost and without the need for external power supply and generation.

SUMMARY

A non-mechanical fluid transfer device is disclosed herein. The device can include at least one tubular body configured to deliver a fluid, the tubular body having an interior surface, an exterior surface, a proximal end, and a distal end. Additionally, the device can include a series of ratchets disposed along an interior surface of the tubular body such that the fluid moves from the proximal end of the tubular body to the distal end of the tubular body when the interior surface of the tubular body is heated to a temperature at or above the Leidenfrost point of the fluid in that environment.

A fluid transfer system is described herein. The fluid transfer system can include a coolant reservoir configured to hold a cooling fluid, a cooling vessel in fluid communication with a heat source such that heat transfer occurs between the heat source and the cooling fluid, and at least one tubular fluid delivery device in thermal communication with the heat source. The tubular fluid delivery device can have a proximal end in fluid communication with the coolant reservoir, a distal end in fluid communication with the cooling vessel, and a series of asymmetric ratchets disposed along an interior surface of the tubular body such that the cooling fluid flows from a proximal end to the distal end when the interior surface of the tubular body is heated above a Leidenfrost point of the cooling fluid.

Additional aspects include a fluid transfer system having a fluid source, a heat source, and at least one tubular fluid delivery device in thermal communication with the heat source. In some aspects, the tubular fluid delivery device can have a proximal end in fluid communication with the fluid source, a distal end, and a series of asymmetric ratchets disposed along an interior surface of the tubular body such that as fluid contained in the fluid source flows from the proximal end to the distal end of the tubular body, water is generated by condensation from the atmosphere.

The above described and other features are exemplified by the accompanying drawings and detailed description.

BRIEF DESCRIPTION OF THE DRAWINGS

This disclosure will be more fully understood from the following detailed description taken in conjunction with the accompanying drawings, in which.

DETAILED DESCRIPTION OF THE INVENTION

Figure 1:
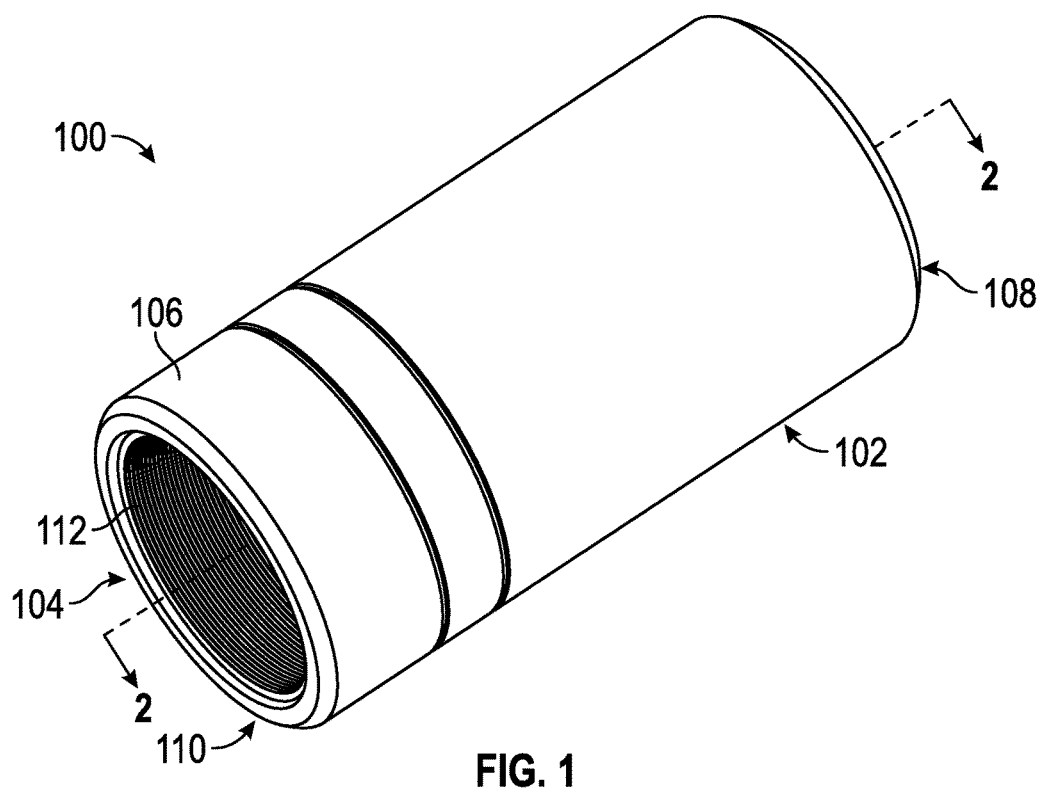
FIG. 1 is a perspective view of a non-mechanical fluid transfer device.

Certain exemplary aspects will now be described to provide an overall understanding of the principles of the structure, function, manufacture, and use of the devices, systems, methods, and/or kits disclosed herein. One or more examples of these aspects are illustrated in the accompanying drawings. Those skilled in the art will understand that the devices, systems, methods, and/or kits disclosed herein and illustrated in the accompanying drawings are non-limiting and exemplary in nature and that the scope of the present invention is defined solely by the claims. The features illustrated or described in connection with any one aspect described may be combined with the features of other aspects. Such modification and variations are intended to be included within the scope of the present disclosure.

Further in the present disclosure, like-numbered components generally have similar features, and thus each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can be determined for any geometric shape. Sizes and shapes of the systems and devices (and the components thereof) can depend at least on the size and shape of the components with which the systems and devices will be used as well as the methods and procedures in which the systems and devices will be used.

Non-mechanical fluid transfer devices (referred to herein as a "Leidenpump" and also referred to as a "Caddell Leidenpump") can be non-mechanical means of liquid transport using the Leidenfrost effect. The placement of a discrete body or substance (such as a liquid) on a surface that is above the boiling or vaporization point of the body can result in the near-instantaneous vaporization (or possibly sublimation) of a thin layer of the body or substance. The creation of this thin layer creates a phenomenon of levitation on the body. That is, the body is supported by a layer of vapor, sometimes referred to as a film layer or cushion. This cushion, in addition to levitating the droplet or other body, serves as an insulator that slows the body's total vaporization. In use, example Leidenpumps can have many applications, including the delivery or transport of coolant fluid or the harvesting of water from the atmosphere due to a novel condensation effect. Examples include cooling computer chips and nuclear reactors and atmospheric water generation. Additionally, in some aspects, utilizing the principles described herein fluid can be transferred against gravity, i.e., uphill.

"Leidenfrost point" as used herein means the point that heat flux between a heated surface and a liquid droplet is at a minimum and the surface between the liquid and the heated surface is filled by a vapor blanket or film. That is, the Leidenfrost point is the point at which a physical phenomenon known as the Leidenfrost effect occurs in which a liquid, in close contact with a mass significantly hotter than the liquid's boiling point, produces an insulating vapor layer keeping that liquid from boiling rapidly. A person of ordinary skill will appreciate that the minimum heat flux can be derived from Zuber's equation and various other heat transfer correlations. Additionally, a person of ordinary skill will understand that the Leidenfrost point of any particular fluid is a function of the physical properties of that fluid and the ambient atmospheric conditions. For instance, as a rough estimate and as a person or ordinary skill will understand, the Leidenfrost point for a drop of water on a metallic surface might occur at 193° C. (379° F.) under standard atmospheric conditions. Additionally, the material forming the Leidenpump and the fluid should be carefully chosen as under some conditions the Leidenfrost point for a given fluid may be higher than the melting point of a particular material forming the Leidenpump, a potential situation could lead to catastrophic failure of the system.

As mentioned, Leidenpumps can function through the manipulation of the vapor flows beneath the body or substance, particularly when the body is a fluid droplet. Through the direction of Poiseuille flow along a ratchet, as along an asymmetric ratchet pattern, the velocity of vapor moving in opposite directions can be controlled and used to drag a droplet or other body continuously in the forward direction. By wrapping this pattern around the inside of a tube—whether as concentrically, in a spiral, or as a chevron—bodies can be further directed and controlled and more efficiently delivered.

Figure 2:
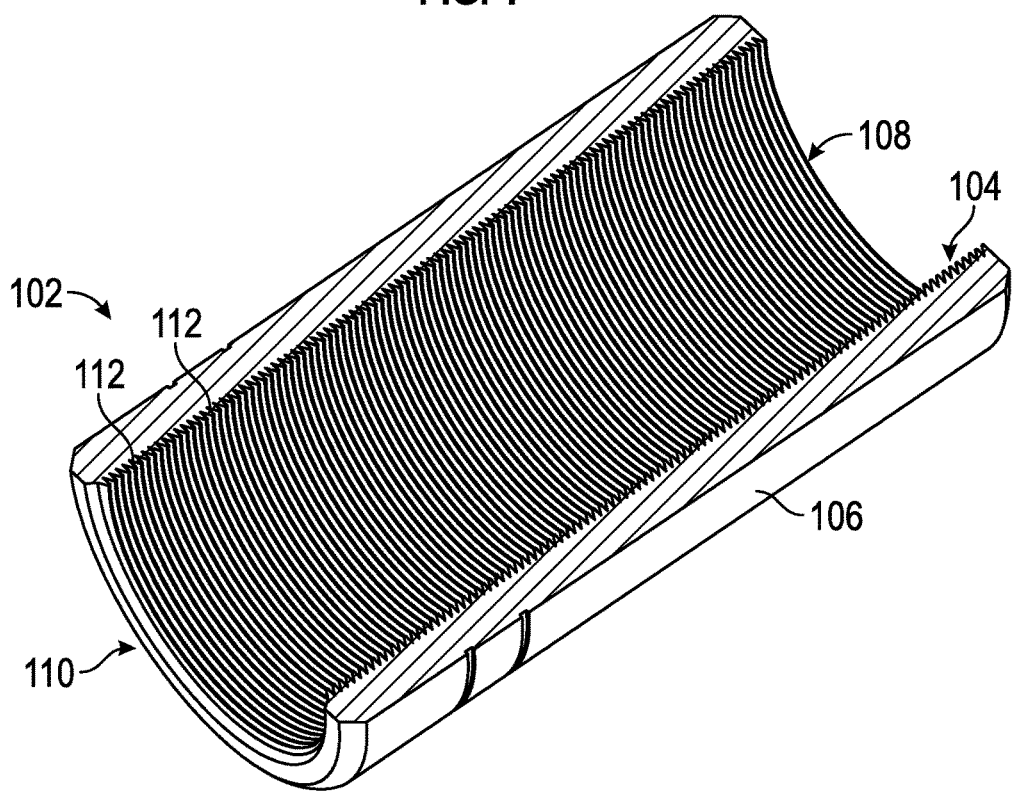
FIG. 2 is a cross-section along line 2 of the non-mechanical fluid transfer device of FIG. 1.
Figure 3:
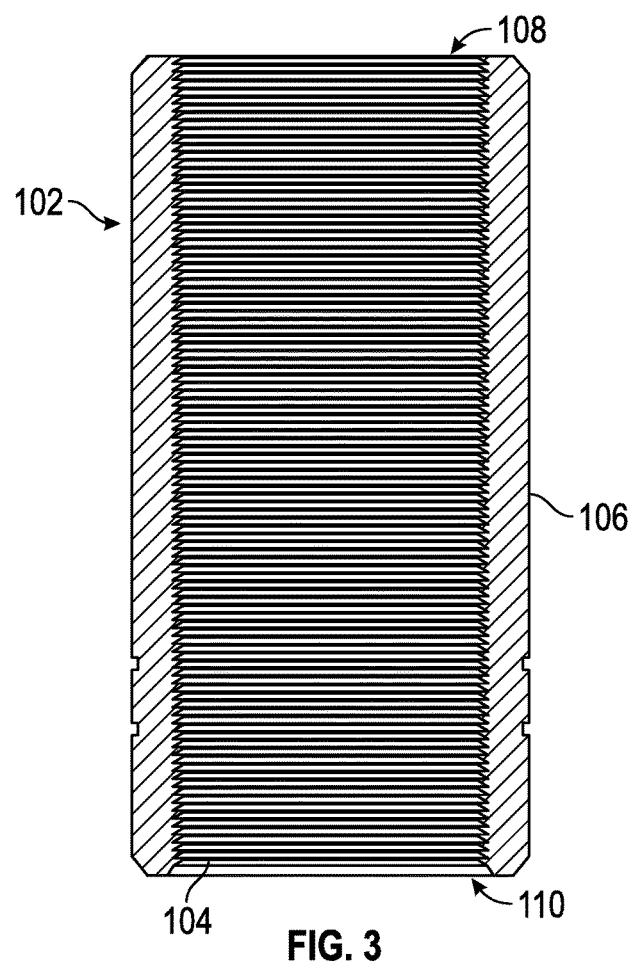
FIG. 3 is a cross-sectional view of the non-mechanical fluid transfer device of FIG. 1.

FIGS. 1-3 illustrate an example non-mechanical fluid transfer device (a "Leidenpump") 100. The Leidenpump 100 includes at least one tubular body 102 that is configured to deliver a fluid (not shown). The fluid can include any fluid, such as water, coolants, oils, propylene glycol, ethylene glycol, and/or any other desired substance. The tubular body 102 can have an interior surface 104, an exterior surface 106, a proximal end, 108, and a distal end 110. Further, the tubular body 102 can have a series of ratchets 112 disposed along the interior surface 104 such that the fluid moves from the proximal end 108 to the distal end 110 when the interior surface 104 is heated to a temperature that is above the Leidenfrost point of the fluid.

Figure 10:
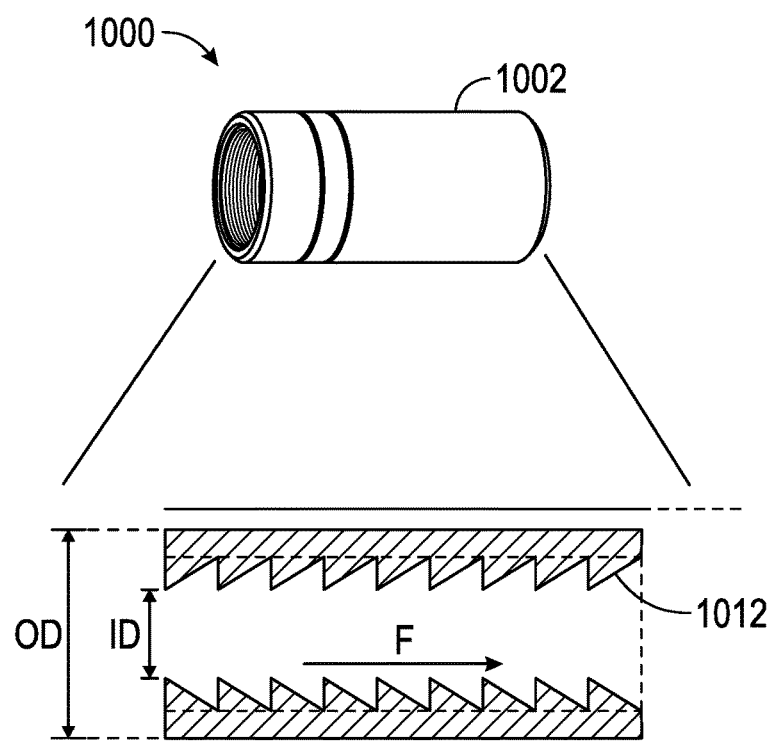
FIG. 10 is a perspective and cross-sectional view of an example fluid transfer device.

In some aspects, the tubular body 102 can have an inner diameter ID and an outer diameter OD. For example, as is shown in FIG. 10, the outer diameter OD can be any dimension suitable for a given application and can be selected to achieve a desired heat transfer from the surroundings of the tubular body to the tubular body. A person of ordinary skill will understand that heat transfer to the tubular body is a function of the surface area of the tubular body and, furthermore, the surface area of the tubular body 102 is a function of the outer diameter OD. Similarly, the inner diameter ID can be any dimension that is suitable for a given application and can be selected, among other things, to achieve a desired flow rate through the tubular body 102.

Figure 4:
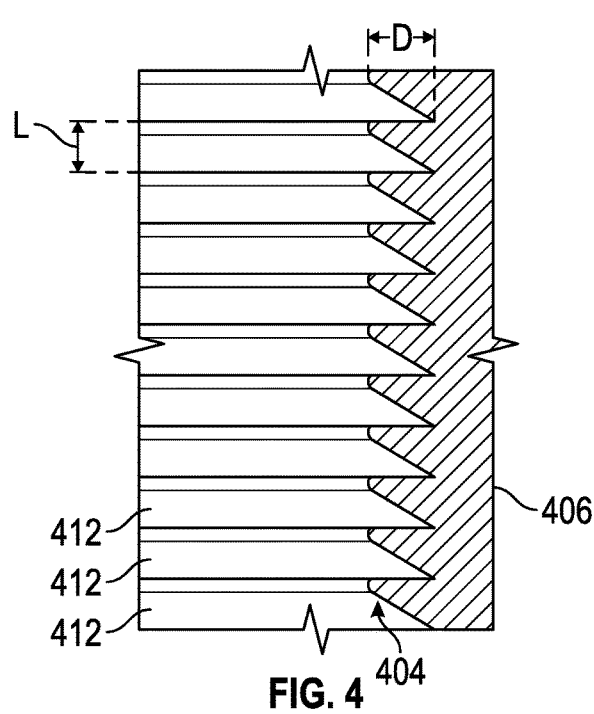
FIG. 4 is a partial perspective cross-sectional view of a fluid transfer device.
Figure 5:
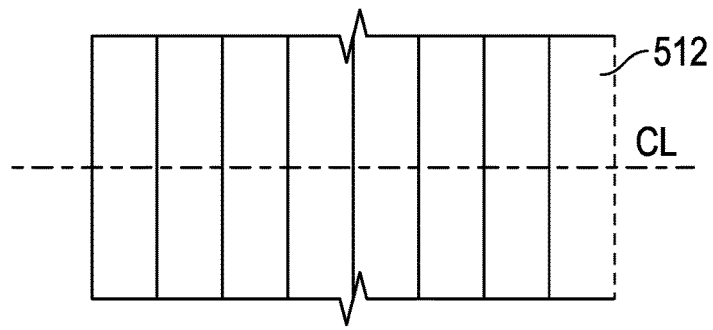
FIG. 5 is a schematic cross-sectional view of an example fluid transfer device having concentric ratcheted grooves.

As is illustrated in FIGS. 1-4, the ratchets 112, 412 can be asymmetric. As used herein "asymmetric" means that at least one side of the ratchet differs in dimensions from the remaining sides. For example, as shown in FIG. 4, the ratchets can be right triangles having a base length L and a height D forming approximately a 90 degree angle such that the hypotenuse of the ratchet, or the face of the ratchet 412, has a different dimension from either the base length L or the height D. Additionally, a person of ordinary skill will understand that although as shown the ratchets have a radius at their apex, this is not necessary. In at least some non-limiting aspects, the ratchets can come to a sharp point at their apex. The ratchet shape can be a function of the method of production.

Figure 6:
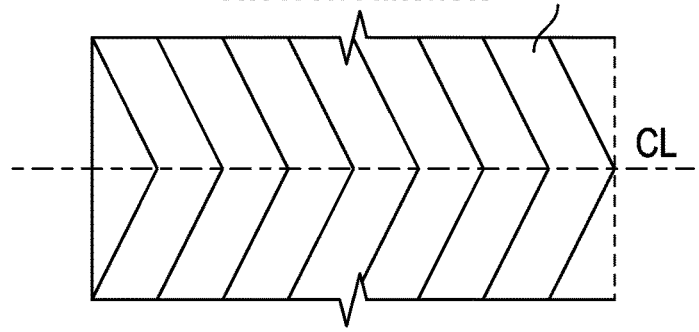
FIG. 6 is a schematic cross-sectional view of an example fluid transfer device having chevron ratchets.
Figure 7:
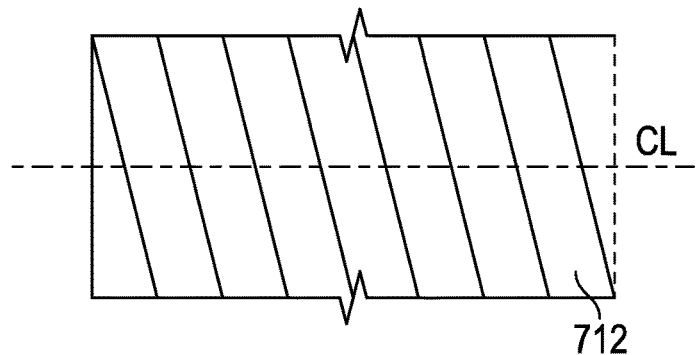
FIG. 7 is a schematic cross-sectional view of an example fluid transfer device having a continuous spiral ratchet.

Moreover, as shown in FIGS. 2-3 and 5-7, the ratchets 112 can be disposed along a length of the tubular body 102. In some aspects, the ratchets 112 can be serially disposed along the length of the tubular body 112. For example, as shown in FIG. 2, which is a cross-section of the tubular body 112 along line 2 shown in FIG. 1, and in FIG. 5, the ratchets 112, 512 can be formed as a circle—as opposed to a spiral or thread—one after another along the length. In some aspects, such as is shown in FIG. 6, the ratchets 612 can be formed in a chevron pattern along the length of the tubular body. As is shown and without limitation, the point of the chevron ratchet 612 can be centered along a center line CL of the tubular body. In other aspects, such as is shown in FIG. 7, the ratchets 712 can be formed as a spiral or thread along the length of the tubular body.

The concentric and spiral aspects can function essentially in the same manner, their main difference being their construction. The chevron pattern, however, can—without limitation—be used as a model for continuous flow and delivery of bodies far beyond the scope of droplets by allowing vapor to escape from underneath the body and along the sides of the tube.

As will be described in more detail below, whether put together as one continuous pipe/tube or as a series of smaller modules, the Leidenpump can be made by casting, machining, or using a custom tap. The length of the tubular body, tooth or ratchet depth, number of teeth/grooves/ratchets per unit length, inner and outer diameters, and the thickness of the tubular body may vary based on any particular application. In some aspects, the tubular bodies can be any length and can be formed as one continuous tubular body, or can be a plurality of tubular bodies or modules that are connected in sequence. In some aspects and without limitation, a tubular body can be any of about 1000 feet or less, 500 feet or less, 50 feet or less, 10 feet or less, 1 foot or less, 5 inches or less, and 1 inch or less. Additionally, in some aspects the tubular body can have any outer diameter OD and inner diameter ID desired. For example and without limitation, the outer diameter can be any of about 5 feet or less, about 1 foot or less, about 5 inches or less, about 1 inch or less, and about 0.5 inches or less. In some non-limiting aspects, the outer diameter can be between about 0.485 to about 0.490 inches. Similarly, the inner diameter ID can be any dimension desired. For example, and without limitation, the inner diameter can be any of about 1 foot or less, about 5 inches or less, about 1 inch or less, or about 0.5 inches or less. In some aspects and without limitation, the ID can be about 0.360 inches. Additionally, the inner diameter or outer diameter can be substantially uniform along the length of the tubular body or it can vary along the length. For example and without limitation, the inner or outer diameter can be larger at the proximal end than at the distal end, or visa versa. In some non-limiting aspects, the ratchet depths can be in the range of about 0.005 inches to about 5 inches, about 0.005 to about 1.0 inch, about 0.01 to about 1.0 inch. For example and without limitation the ratchet depth can be about 0.0177 inches. Similarly, the ratchet lengths can be any desired length. In some aspects and without limitation, the ratchet length can be about 1 inch or less, about 0.5 inches or less, 0.1 inches or less, 0.01 inches or less, or 0.001 inches or less. For example and without limitation, the ratchet length can be about 0.0094 to about 0.00945 inches.

Furthermore, the Leidenpump or tubular body can be formed of any material suitable to achieve fluid flow therethrough. For example, materials can be chosen based on known heat transfer coefficients and properties such that the desired temperature is achieved along the interior surface, including along the face of the ratchets, to reach temperatures that reach and/or exceed the desired Leidenfrost point for the fluid or body to be transferred. As described above, the material forming the Leidenpump and the fluid should be carefully chosen as under some conditions the Leidenfrost point for a given fluid may be higher than the melting point of a particular material forming the Leidenpump, an instance that could lead to catastrophic failure of the system. Additionally, the material can be selected to achieve various machining properties and to otherwise aid in formation of the tubular body. In some aspects, the material forming the tubular body can be thermally conductive such that heat can be transferred from the external surface of the tubular body to the internal surface of the tubular body. Thermally conductive materials can include a variety of metals, graphites, carbon nanomaterials, glass, plastics, and other materials. For example, and without limitation, the tubular body can be formed of 360 Brass, 316 stainless steel, 304 stainless steel, titanium, chromium alloys, and any other metal or metal alloy as will be understood by a person of ordinary skill in the art. The tubular body can be formed in any manner known in the art, which can include machining, molding, casting, blowing, or any other method.

In use, the Leidenpump can be utilized in a variety of applications that require the efficient transfer of fluid. Additionally, the Leidenpump, due to condensation that occurs at and above the Leidenfrost point as fluid moves through the tube, can be used in atmospheric water generation applications as will be described below.

Figure 8:
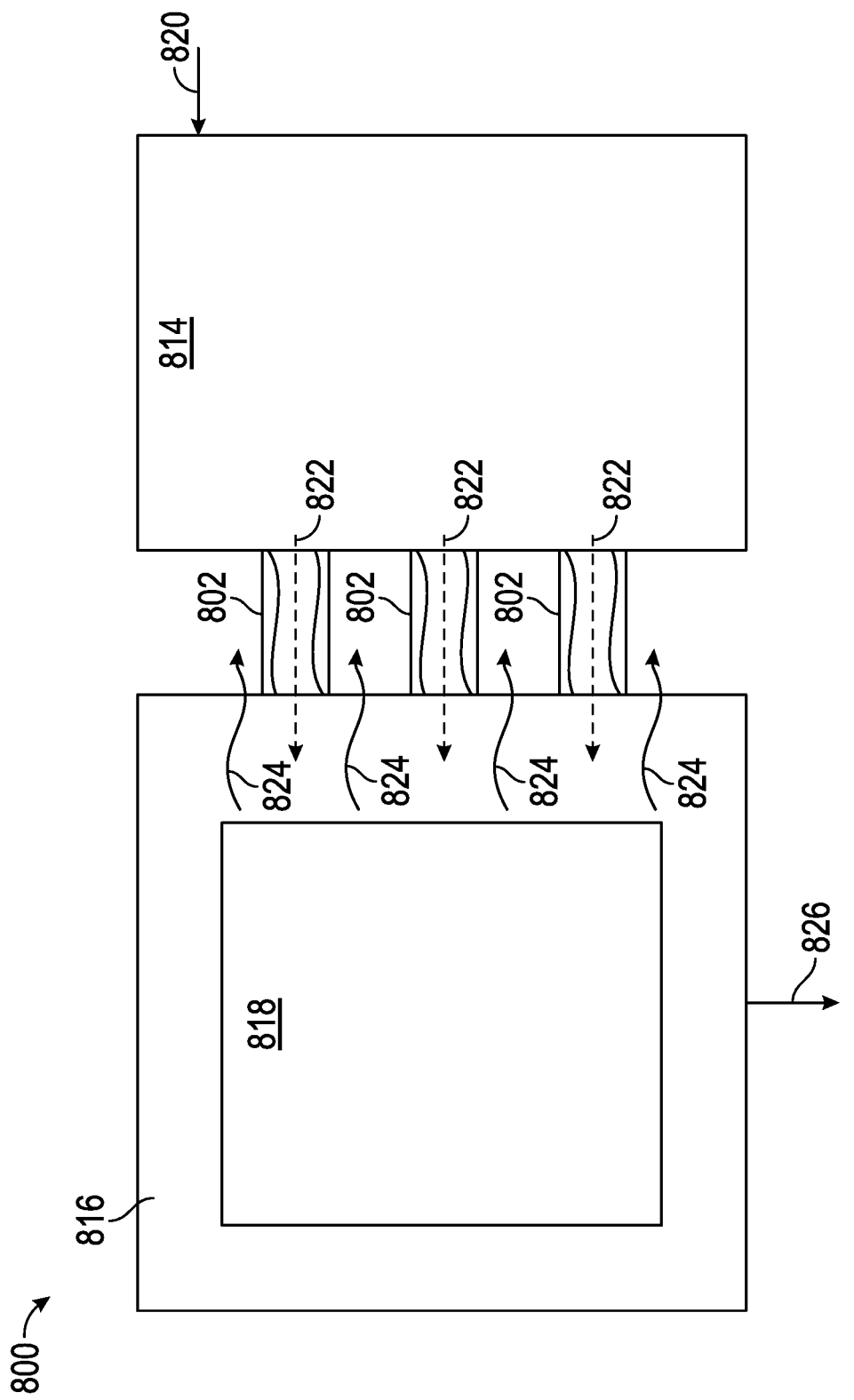
FIG. 8 is a schematic view of an example fluid transfer system.

FIG. 8 illustrates an example fluid transfer system 800 in which a coolant reservoir 814 is configured to hold a cooling fluid. The coolant reservoir can include a cooling fluid inlet 820 that is configured to replenish cooling fluid to the reservoir as the cooling fluid is cycled through the system. The coolant reservoir 814 can be fluidly coupled to a cooling vessel 816 with at least one tubular fluid delivery device (or "Leidenpump") 802. The cooling vessel 816 can be configured to cool a heat source 818 such that heat transfer occurs between the cooling fluid and the heat source 818 thereby cooling the heat source 818 and warming the cooling fluid. A person of ordinary skill will readily understand that the heat source can be any source capable of heating the tubular delivery device 802 above the Leidenfrost point of the fluid in the system. That is, a person of ordinary skill in the art will understand that the heat source could even include the ambient air conditions as with some fluids and system conditions, the thermal energy of the air itself can be great enough in magnitude to cause Leidenfrost behavior. For example and without limitation, in a system using liquid nitrogen as the cooling fluid, the Leidenfrost point can be below typical ambient temperature conditions. Furthermore, the heat source 818, either directly or indirectly through the cooling fluid—as shown by lines 824—can heat an external surface of the tubular fluid delivery device 802. As the tubular device 802 is heated above a Leidenfrost point of the cooling fluid, the cooling fluid will flow from the coolant reservoir 814 to the cooling vessel 816 in the direction of line 822. As the cooling fluid is heated, the fluid is cycled out of the cooling vessel 816 through outlet 826. The cooling fluid can then be cooled and recycled through the system or otherwise disposed of. In this aspect, the system 800 accomplishes transfer and cycling of cooling fluid from the coolant reservoir 814 to the cooling vessel 816 without any mechanical pumps and without the need of an external power source. As such, the fluid transfer system 800 is a robust system that is capable of operating during blackout and other offline conditions, thus providing a safety mechanism to systems that require cooling to maintain safe operation such as nuclear reactors.

Figure 9:
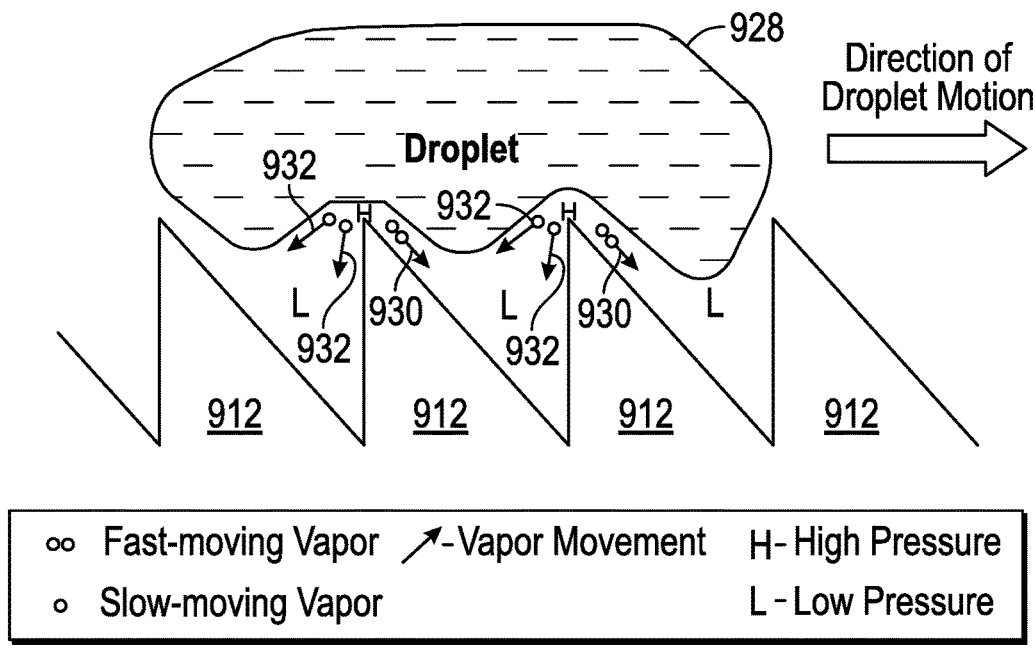
FIG. 9 is a schematic view of a fluid droplet moving along a transfer device.

Specifically, as shown in FIG. 9, fluid transfer systems can function by utilizing the Leidenfrost effect as is described above. As shown, a droplet of fluid 928 moves along the ratchets 912 along the length of the tubular body. As the droplet moves along the ratchets 912, a portion of the droplet 928 is heated above the Leidenfrost point creating an insulating vapor layer as described herein. This insulating vapor layer maintains a thermal insulating layer between the droplet and the ratchets causing the droplet to maintain a temperature that is significantly cooler than the ratchet temperature. As shown, the asymmetric ratchets 912 cause a pressure gradient between a high pressure point H and a low pressure point L. The high pressure point H occurs at the apex of the asymmetric ratchet 912, with the low pressure point L occurring along the face of the ratchet that is perpendicular to the direction of droplet flow. As shown, this pressure gradient creates vapor movement (Poiseuille flow) from the insulating vapor layer surrounding the droplet 928. That is, vapor moves at a relatively faster velocity along arrows 930 than it does along arrows 932. This velocity and pressure gradient causes the droplet 928 to move along the ratchets 912. As shown in FIG. 10, in the Leidenpump 1000 the droplets or fluid flows along line F of the tubular body 1002. That is, the fluid flows such that the droplet contacts the perpendicular face of the ratchet 1012 as it travels along line F.

Figure 11:
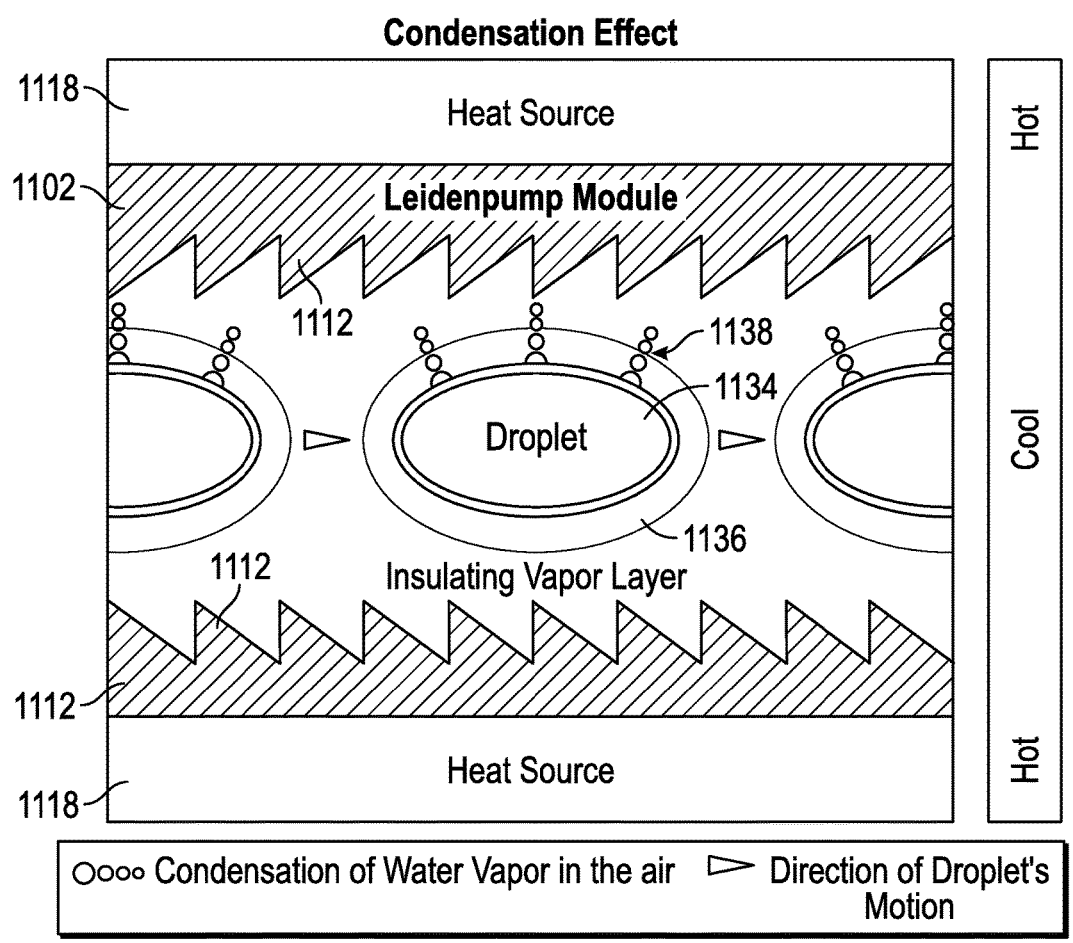
FIG. 11 is a schematic cross-sectional view of an example fluid transfer system.

As is shown in FIG. 11, another application is that of atmospheric water generation. That is, a Leidenpump tubular body 1102 can include a plurality of ratchets 1112 disposed along an interior surface of body 1102. The Leidenpump tubular body 1102 can be configured to carry a droplet of fluid 1134. Additionally, the Leidenpump 1102 can be configured to be in thermal communication with a heat source 1118. Example heat sources can include exposure to solar radiation, nuclear reactor cores, electric heating elements, or any other heat source. In this aspect, as the droplet 1134 moves along the length of the tubular body 1102, it is heated above the Leidenfrost point of the fluid and an insulating vapor layer 1136 is formed along the surface of the droplet 1134. The insulating vapor layer 1136 insulates the droplet from direct contact with the tubular body. A person of ordinary skill in the art will understand that the insulating vapor layer does not have to fully surround or encase the droplet, but rather can form a layer between only the droplet and the ratchet surface. Additionally, a high-temperature condensation effect can occur by which water vapor 1138 in the air actually condenses on the Leidenfrost droplets 1134 as they move along the length of the Leidenpump. This effect can be exploited for atmospheric water generation, particularly in warm regions where generation via refrigeration techniques would be particularly inefficient and harmful to the environment or in cases where a large water source is nearby and could be expanded through a Leidenpump atmospheric water generation array, termed a Leidenfarm. Experimental condensation yields have pushed upward of 30% in mass gain per droplet, and increased humidity only improves the mass yield.

In some non-limiting aspects, Leidenpump tubes can be small in order to handle droplets and small discrete bodies of water. Thus, to be used practically in some aspects described herein, a large array of Leidenpumps may be utilized, each carrying droplets in rapid succession to maximize the mass flow rate. In other words, though a coolant reservoir could be filled from a river or other large volume fluid source, the coolant may be dispensed as droplets into the Leidenpump tube itself. A large number of tubes may therefore be utilized to deliver the desired quantity of coolant. As described above, larger pipes may also employ the Leidenfrost Effect, particularly with the "chevron" pattern described above.

With respect to the above description, it is to be realized that the optimum composition for the parts of the invention, to include variations in components, materials, size, shape, form, function, and manner of operation, assembly and use, are deemed readily apparent to one skilled in the art, and all equivalent relationships to those illustrated in the examples and described in the specification are intended to be encompassed by the present invention. Therefore, the foregoing is considered as illustrative only of the principles of the invention. Further, various modifications may be made of the invention without departing from the scope thereof, and it is desired, therefore, that only such limitations shall be placed thereon as are set forth in the appended claims.

What is claimed is:

1. A nuclear reactor fluid transfer system, comprising:
    a coolant reservoir configured to hold a cooling fluid, wherein the coolant reservoir comprises an inlet for receiving the cooling fluid and an outlet for discharging the cooling fluid;
    a cooling vessel comprising an inlet in fluid communication with the outlet of the coolant reservoir for receiving the cooling fluid, wherein the cooling vessel is in fluid communication with a nuclear reactor core such that heat transfer occurs between the nuclear reactor core and the cooling fluid within the cooling vessel; and
    at least one tubular fluid delivery device in thermal communication with the nuclear reactor core and in fluid communication with the coolant reservoir and the cooling vessel, each one of the at least one tubular fluid delivery device including a thermally conductive tubular body having a proximal end in fluid communication with the outlet of the coolant reservoir, a distal end in fluid communication with the inlet of the cooling vessel, and a series of asymmetric ratchets disposed along an interior surface of the tubular body such that the cooling fluid flows from the coolant reservoir to the cooling vessel when the interior surface is heated above a Leidenfrost point of the cooling fluid.

2. The system of claim 1, wherein the asymmetric ratchets are disposed along a length of the tubular body, disposed along a length of the tubular body in a chevron pattern, disposed in a continuous spiral along a length of the tubular body, or any combination thereof.

3. The system of claim 1, wherein the at least one tubular fluid delivery device is formed of a metal.

4. The system of claim 1, wherein the cooling fluid is water.

5. The system of claim 1, wherein the system comprises a plurality of tubular fluid delivery devices to form a Leidenpump atmospheric water generation array.

6. The system of claim 1, wherein the ratchets are disposed along a length of the tubular body, disposed along a length of the tubular body in a concentric pattern.

* * * * *